(12) United States Patent
Perlman

(10) Patent No.: US 7,344,747 B2
(45) Date of Patent: Mar. 18, 2008

(54) OXIDATIVE STABILIZATION OF OMEGA-3 FATTY ACIDS IN LOW LINOLEIC ACID-CONTAINING PEANUT BUTTER

(75) Inventor: Daniel Perlman, Arlington, MA (US)

(73) Assignee: GFA Brands, Inc., Cresskill, NJ (US)

( * ) Notice: Subject to any disclaimer, the term of this patent is extended or adjusted under 35 U.S.C. 154(b) by 635 days.

(21) Appl. No.: 10/834,518

(22) Filed: Apr. 29, 2004

(65) Prior Publication Data

US 2005/0244564 A1    Nov. 3, 2005

(51) Int. Cl.
*A23D 9/00*    (2006.01)
(52) U.S. Cl. .................. 426/601; 426/632; 426/633; 426/330.6
(58) Field of Classification Search ............... None
See application file for complete search history.

(56) References Cited

U.S. PATENT DOCUMENTS

| | | | |
|---|---|---|---|
| 4,895,725 A | 1/1990 | Kantor et al. | |
| 4,913,921 A | 4/1990 | Schroeder et al. | |
| 4,963,380 A | 10/1990 | Schroeder et al. | |
| 4,963,385 A | 10/1990 | Antrim et al. | |
| 5,084,294 A | 1/1992 | Schroeder et al. | |
| 5,382,442 A | 1/1995 | Perlman et al. | |
| 5,518,753 A | 5/1996 | Bracco et al. | |
| 5,624,703 A | 4/1997 | Perlman et al. | |
| 5,684,232 A * | 11/1997 | Horn et al. ................ | 800/298 |
| 5,874,117 A | 2/1999 | Sundram et al. | |
| 5,945,578 A | 8/1999 | Moore | |
| 6,025,008 A | 2/2000 | Akahoshi et al. | |
| 6,121,472 A | 9/2000 | Knauft et al. | |
| 6,214,405 B1 | 4/2001 | Horn et al. | |
| 6,428,461 B1 | 8/2002 | Marquez et al. | |
| 6,447,833 B1 | 9/2002 | Widlak | |
| 6,583,303 B1 * | 6/2003 | DeBonte et al. ............. | 554/223 |
| 2005/0054724 A1 * | 3/2005 | Mustad et al. .............. | 514/547 |

OTHER PUBLICATIONS

Hui, Y. H. 1996. Baileys Industrial Oil and Fat Products, 5th edition, volumn 1, Wiley-Interscience Publication, New Yrok, p. 39, 444 & 445.*

Firestone, David, ed. 1999. Physical and Chemical Characteristics of Oils, Fats and Waxes. AOCS Press, Champaign, Ill., p. 31, 56, 88 & 89.*

Firestone, D. 1999. Physical and Chemical Characteristics of Oils, Fats and Waxes. AOCS Press, Champaign, Ill. p. 84-85.*

Gunstone, Frank. 1986. The Lkpid Handbook, 2$^{nd}$ edition, Chapman & Hall. New York. p. 121.*

Chan, J. et al. 1991. American J. of Clinical Nutrition 53:1230.*

Ferretti, A. et al. 1996. Prostaglandins, Leukotrienes and Essential Fatty Acids 54(6)451.*

Hoz, L. 2003. Meat Science 65:1039.*

NI Eidhin, D. et al. 2003. Journal of Food Science 68(1)345.*

Santos, C. et al. 2004. Food Chemistry 88:123.*

Corbett (2002) *PBI Bulletin* 1:1-4.

Weng et al., Apr. 2003, *Appl. Spectrosc.*, 57(4):413-418.

www.canola-council.org/pubs/chemical17-12.pdf, 2004.

Goodman et. al. "Fat Soluable Vitamins", 8$^{th}$ ed. p. 1524 (1993).

* cited by examiner

*Primary Examiner*—Carolyn Paden
(74) *Attorney, Agent, or Firm*—Welsh & Katz, Ltd.

(57) ABSTRACT

A food composition in which omega-3 fatty acids are stabilized against oxidation is disclosed. The food composition contains about 4 to about 100 weight percent of the composition in which triglycerides containing omega-3 fatty acids (and other fatty acids) are stabilized against oxidation in the absence of encapsulation. The fatty acid portion of the oil in the completed food composition includes less than about 10 percent by weight linoleic acid, at least 75 percent by weight of monounsaturated plus saturated fatty acids, and at least 3 percent by weight omega-3 fatty acids. The food composition can also contain comminuted peanuts, e.g., peanut butter, in which case the composition is also stabilized against photo-oxidation and the fatty acid portion of the oil portion of the food can contain less than about 15 percent by weight linoleic acid and at least 1 percent by weight omega-3 fatty acids. Methods of protecting a food composition from oxidation and photodegradation are also disclosed.

37 Claims, No Drawings

US 7,344,747 B2

OXIDATIVE STABILIZATION OF OMEGA-3 FATTY ACIDS IN LOW LINOLEIC ACID-CONTAINING PEANUT BUTTER

TECHNICAL FIELD

This invention concerns an oil composition that contains at least about 75 percent by weight saturated and monounsaturated fatty acids, less that about 10 weight percent doubly-unsaturated fatty acids and at least about 3 percent by weight triply-unsaturated fatty acids. This invention also concerns food products prepared containing that or another oil composition such as peanut butter, peanut spread or peanut oil-containing food composition that has outstanding oxidative stability despite the fact that it been supplemented with an oil containing alpha-linolenic acid (18:3) or other omega-3 oil that is readily oxidized.

BACKGROUND ART

Edible oils are composed of a diversity of triglyceride molecules (triester molecules consisting of glycerin and any three of a variety of fatty acids). The fatty acids typically contain twelve, fourteen, sixteen or eighteen carbon atoms, although some longer and some shorter fatty acids can also be present. With the exception of the tropical oils such as palm and coconut oil, the majority of fatty acids in most plant- and animal-derived oils of commercial significance contain eighteen carbon atoms (C18). Each of those C18 fatty acids can contain zero, one, two or three unsaturated carbon-to-carbon bonds and are referred to as saturated (18:0), monounsaturated (18:1), di- or doubly-unsaturated (18:2) or tri- or triply-unsaturated (18:3), respectively. Fatty acids that contain two, three or more unsaturated bonds are referred to as polyunsaturated. The shorter fatty acids are rarely present in unsaturated form. Fatty acids that contain three or more unsaturated bonds are normally unstable and oxidize readily in air or when exposed to light.

Polyunsaturated fatty acids are not metabolically synthesized in mammals, and are therefore termed "essential fatty acids" as nutrients in the mammalian diet. The most common polyunsaturated fatty acids include the so-called "omega-6" fatty acids [e.g., the 18 carbon molecule, linoleic acid (18:2), that has two carbon-carbon unsaturated chemical bonds] and the so-called "omega-3" fatty acids, [e.g., the 18 carbon molecule, alpha-linolenic acid (18:3), that has three carbon-carbon unsaturated chemical bonds], as well as longer chain omega-3 molecules such as docosahexaenoic acid (DHA) and eicosapentaenoic acid (EPA) that have greater numbers of carbon-carbon unsaturated chemical bonds, and that are abundant in fish oils.

As the number of carbon-carbon unsaturated double bonds in a fatty acid molecule increases, the oxidative stability of triglyceride fats and oils containing these fatty acids decreases. Off-flavor development and rancidity typically accompany oxidation of omega-6 and omega-3 fatty acids. For example, the omega-3 fatty acids in conventional canola oil (containing approximately 9 percent by weight alpha-linolenic acid) are susceptible to oxidation. Consequently, this oil is not recommended as commercial frying oil because heating accelerates the process of fatty acid oxidation. Oils such as flaxseed oil that contain a much higher concentration of alpha-linolenic acid (57 percent) are considerably more susceptible to oxidation than canola oil and must be refrigerated and protected from light to prevent the development of off flavors. Oils such as menhaden fish oil contain the longer chain omega-3 fatty acids, e.g., DHA and EPA, are also unstable with exposure to oxygen and light, and can rapidly develop off-flavors.

Accordingly, it is challenging to develop new strategies for stabilizing fats and fat-containing foods carrying omega-3 fatty acids. Of the omega-3 fatty acids, alpha-linolenic acid is not as unstable as docosahexaenoic acid (DHA) or eicosapentaenoic acid (EPA), and is therefore a good candidate for including as a supplement in foods. The problem of omega-3 instability and off-flavor development in food is widely appreciated, and is evident in the following patent literature.

Kantor et al., in U.S. Pat. No. 4,895,725, describe foods that contain vegetable oils capable of masking the odor and taste of omega-3 fatty acids in fish oil, providing that the fish oil has been first microencapsulated within gelatin or gelatin-acacia gum microcapsules.

Akahoshi et al., in U.S. Pat. No. 6,025,008, describe yoghurt containing the omega-3 fatty acids, DHA or EPA, in which sweet substances; i.e., reducing sugars, together with oxygen-blocking packaging can prevent the development of fishy odor in the yoghurt.

Schroeder et al., in U.S. Pat. Nos. 4,913,921, No. 4,963, 380, and No. 5,084,294, teach addition of fructose to fish oil-supplemented food products to help control oxidative rancidity owing to the presence of omega-3 fatty acids.

Antrim et al., in U.S. Pat. No. 4,963,385, teach adding sugar, sugar alcohols and metal ion chelators to aqueous food emulsions containing a fish oil to prevent rancidity.

Marquez et al., in U.S. Pat. No. 6,428,461 B1, describe a method for reducing oxidative rancidity of polyunsaturated lipids containing omega-3 fatty acids by combining a number of different polyamine compounds with the lipids.

Bracco et al., in U.S. Pat. No. 5,518,753, describe a triglyceride mixture or a food composition-containing a triglyceride mixture in which the fatty acid composition includes 50-70 percent by weight monounsaturated oleic acid, up to 10 percent by weight saturated fatty acids and from 30 to 40 percent polyunsaturated fatty acids. The polyunsaturated fatty acids include 20-35 percent linoleic acid and several omega-3 fatty acids including 1.5-4 percent C18:3,n-3 (alpha-linolenic acid), 0.1-0.5 percent C18:4,n-3, 0.2-1 percent C20:5,n-3 (EPA) and 0.1-0.8 percent C22:6, n-3 (DHA). Although the moderately elevated level of oleic acid can contribute to oxidative stability, it has been found that the substantial concentration of linoleic acid (20-35 percent by weight) in the composition decreases oxidative stability of omega-3 fatty acids. Therefore, the composition of Bracco et al. is not useful in the present invention.

An example of oxidative stabilization of an omega-6 fatty acid may be found in the data of Sundram et al. in U.S. Pat. No. 5,874,117. That patent describes corn oil and its linoleic acid content that is surprisingly well stabilized against oxidation by dilution into palm oil that is rich in saturated fatty acids.

In recent years, plant breeding has been used to improve the oxidative stability of soybean oil and canola oil by reducing their substantial levels of omega-3 alpha-linolenic acid (i.e., 6-10 percent) as well as omega-6 linoleic acid. Similarly, within the past ten years, plant breeding has been used with peanuts to produce peanut oils that contain elevated levels of oleic acid and greatly reduced levels of linoleic acid.

For example, conventional peanuts contain approximately 46 percent by weight oleic acid and approximately 32 percent by weight linoleic acid, (and approximately 17 percent by weight mixed saturated fatty acids). However, the peanut oils resulting from plant breeding described by Moore in U.S. Pat. No. 5,945,578 contains between 80 and 85 percent oleic acid and only 1.5 to 2.5 percent linoleic acid. The peanut oil described by Knauft et al. in U.S. Pat. No. 6,121,472 contains between 74 and 84 percent oleic acid and only 2 to 8 percent linoleic acid, whereas the peanut oil of Horn, et al. in U.S. Pat. No. 6,214,405 contains between 78 and 82 percent oleic acid and only 2.8 to 4.9 percent linoleic acid.

Thus, the linoleic acid content of these varieties of peanuts has been reduced approximately 10-20-fold, whereas the oleic acid content has been nearly doubled (i.e., a 20-fold increase in the ratio of oleic:linoleic acid) compared to conventional peanut varieties. The improved oxidative stability of these peanut oils resulting from the higher level of oleic acid and lower level of linoleic acid has been recognized by the inventors of the above patents.

Similarly, breeding has altered the content of fatty acids esterified in canola and other oils. Thus, Corbett (2002) *PBI Bulletin* 1:1-4, reports a high oleic canola available commercially under the designation Natreon™ contains 75 percent oleic, 14 percent linoleic and 3 percent linolenic acids, with the remaining saturated fatty acids comprising less than 7 percent. A so-called low linolenic oil was said to contain 65 percent oleic, 22 percent linoleic and 4 percent linolenic acids. A commodity canola oil was said to contain 60 percent oleic, 20 percent linoleic and 10 percent linolenic acids. High oleic acid sunflower oil was said to contain less than one percent linolenic acid, as do high oleic acid safflower and olive oils, whereas high oleic acid soybean oil contains 3 percent linolenic acid.

After the effort of selecting and breeding varieties of soybeans, canola, and peanuts whose expressed specialty oils contain reduced levels of linoleic acid and exhibit improved oxidative stability, it would seem counterproductive and counterintuitive to add back an edible oil rich in polyunsaturated fatty acids because such addition would presumably reduce the oxidative stability of the specialty oil. Indeed, the literature does not suggest the addition of omega-3 polyunsaturated fatty acids to peanut butter, peanut oils or other comminuted peanut-containing products that have been produced from the special varieties of peanuts described above by Moore, Knauft et al. or Horn et al. that are distinguished by their low level, e.g., generally between 2 and 8 percent, of the omega-6 fatty acid, linoleic acid. The disclosure that follows illustrates an oxidative stability advantage that is obtained by the addition of an oil rich in omega-3 fatty acids to products of one of the above-described special varieties of oil.

BRIEF SUMMARY OF THE INVENTION

One aspect of the invention contemplates a food composition that contains an oil portion that can comprise about 4 to about 100 weight percent of the composition in which triglycerides containing omega-3 fatty acids (and other fatty acids) are stabilized against oxidation in the absence of the encapsulation taught in Kantor et al. U.S. Pat. No. 4,895,725. Overall, the fatty acid portion of the oil in the food composition includes less than about 10 percent by weight linoleic acid, at least 75 percent by weight of monounsaturated plus saturated fatty acids, and at least 3 percent by weight omega-3 fatty acids. The food composition preferably includes about 4 to about 98 percent by weight of a peanut oil that contains less than 10 percent by weight linoleic acid. The food composition also includes a triglyceride-based omega-3 fatty acid enriching oil containing at least 10 about percent omega-3 fatty acids.

Another aspect of this invention contemplates an edible oil whose fatty acids are comprised of about 3 to about 20 percent by weight of alpha-linolenic acid, not more than about 10 percent by weight of linoleic acid (18:2), and at least 75 percent by weight of monounsaturated oleic acid (18:1) plus saturated fatty acids. In preferred practice, not more than about 7 percent of the fatty acids of the edible oil are linoleic acid, with the remainder being linolenic or other omega-3 fatty acids, oleic acid and the saturated fatty acids.

A further aspect of the invention concerns a food product prepared containing the above or another oil composition, such as peanut butter, peanut spread or a peanut oil-containing food composition that has outstanding oxidative stability despite the fact that it been supplemented with an unstable oil containing alpha-linolenic acid (18:3) or other omega-3 oil or fat that is readily oxidized. A feature of this aspect of the invention is that the doubly unsaturated fatty acid, e.g., linoleic acid (18:2), level in the fat portion of the food composition is less than about 15 percent by weight based upon the total fatty acids present in the fat (oil). This level is less than 50 percent (one-half) of the normal 18:2 level present in a regular peanut oil (32 percent by weight). The oil portion of this food product further contains at least 75 percent by weight of monounsaturated plus saturated fatty acids, and at least 1 percent by weight omega-3 fatty acids.

DEFINITIONS

For the purpose of better understanding the description and claims of the present invention, the following terms used in this document shall have the following meanings. If not defined otherwise, common words and expressions have the meanings normally attributable to them as provided in Webster's Dictionary (unabridged) and in the Encyclopedia Britannica.

The term "a nutritionally enriched food composition" is used broadly and generally, referring to an edible processed food that contains an amount and/or a type of nutrient(s) beyond that originally present in the food harvested, or refined from nature.

The term "comprises" or "comprising" is meant to broadly include the item(s) of composition and/or the steps or action(s) that follow this word, together with any other useful items and/or steps that are not declared, and thus is meant to in no way limit or exclude the scope of what follows this word, comprising.

The terms "low linoleic acid oil" and "low linoleic acid peanut oil" means an oil such as peanut oil isolated from any one of a variety of peanuts that, through plant breeding, genetic modification or other steps, contains less than about 10 percent by weight linoleic acid, based upon the total fatty acid content of the peanut oil. Because conventional peanuts produce an oil with approximately 32 percent by weight omega-6 linoleic acid (18:2), a low linoleic acid peanut oil contains approximately 50 percent or less of the normal level of the fatty acid.

The term "triglyceride-based omega-3 enriching oil" means an edible fat or oil that is a good source of omega-3 fatty acids and that can be added to the peanut oil-containing food composition to increase the proportion of these fatty acids in the food product. The enriching oil can be obtained from any living organism, e.g., vegetable or animal or microbial origin, provided that the oil is a good source of omega-3 fatty acids. It is preferable that the enriching oil contain more esterified omega-3 fatty acids than linoleic acid because it has found that the oxidation of linoleic acid contributes to the undesirable oxidation of omega-3 fatty acids. Thus, for example, if 10 percent by weight of an enriching oil containing approximately 50 percent linoleic acid and 50 percent omega-3 fatty acids were added to 90 percent by weight of a food composition already containing about 10 percent by weight linoleic acid, the final concentration of fatty acids includes about 14 percent linoleic acid and 5 percent omega-3 fatty acids. To minimize the oxidative effect of linoleic acid upon omega-3 fatty acids, there is a clear advantage in starting with both a food composition and an enriching oil that contain low levels of linoleic acid (the final level of linoleic acid is kept to under about 10 percent weight of the total fatty acids in fat portion of the food composition). At least 75 percent by weight of the fatty acids are monounsaturated plus saturated fatty acids as these are slow to oxidize and help stabilize the omega-3 fatty acids.

Considering the fatty acid content of a preferred peanut oil component of a contemplated food composition (before omega-3 enrichment), it is preferable to keep the linoleic acid content of the peanut oil (also known as the "endogenous oil" of the peanut) to less than 10 percent by weight based upon the fatty acid content of the peanut oil, and even more preferable to keep the linoleic acid content to less than 5 percent by weight.

The term "comminuted peanuts" refers to the combination of peanut solids and oil produced by physically breaking down the peanuts, e.g., in a milling, chopping or grinding machine, to form smaller particles, but does not depend on the specific method utilized. It is also meant to describe the physical state of peanuts in any peanut butter or peanut spread or any other comminuted or chopped peanut-containing product after the peanuts have been processed through a grinding, milling or chopping machine. This includes coarse or chunky as well as a smooth peanut paste. The method of forming comminuted peanuts can involve grinding, chopping, or other techniques or combinations of techniques.

The term "exposed to light and air" refers to the normal exposure of a food to ambient (indoor and outdoor) levels of sunlight and air, both of which can contribute to the oxidation of fatty acids, and in particular polyunsaturated fatty acids including omega-3 fatty acids. The opacity of comminuted peanuts helps block entry of sunlight, and therefore provides a degree of protection against photooxidation which is known to negatively impact the shelf life of omega-3 fatty acid-containing food products.

The term "flax oil" is synonymous with flaxseed oil and linseed oil. Commercial preparations of flax oil typically contain about 45 to about 60 percent alpha-linolenic acid (omega-3), about 14 to about 28 percent oleic acid, about 12 to about 18 percent linoleic acid (omega-6) and about 5 percent palmitic acid.

In addition to flax oil, varieties of canola oil have been reported to contain about 20 to about 30 percent by weight alpha-linolenic acid (Canola Council of Canada, Winnipeg, MB), and these oils can also serve as omega-3 enriching oils.

Omega-3 enriching oils are also defined as including the longer chain omega-3 fatty acids commonly abbreviated as EPA (eicosapentaenoic acid) and DHA (docosahexaenoic acid). These are found in fish oils and other edible marine oils. These omega-3 enriching oils are also collectively referred to as oils (or fats) that contain multiply-unsaturated fatty acids.

The term "non-fat fat-soluble bioactive food additive" is meant to include non-triglyceride nutrients, micronutrients and other additives having biological activity that can be dissolved in fat and are beneficial to humans when ingested. Because the peanut oil described herein is resistant to oxidation, it tends to oxidatively protect such additives that have been dissolved in the oil. The bioactive additives can range from phospholipids to fat-soluble vitamins to biological antioxidants. Illustrative antioxidants include vitamin C palmitate, vitamins D, E (alpha-, beta-, gamma- and delta-tocopherol), the four corresponding tocotrienols, vitammin K, and a carotenoid that is a hydrocarbon (a carotene) such as α-carotene, β-carotene or lycopene, or is an oxygenated carotenoid (a xanthophyll) such as lutein, zeaxanthin or astaxanthin.

The term "substantially opaque to light" in the context of a food composition that can protect omega-3 fatty acids from photooxidation means that the optical density of the food composition is at least 2.0 over the ultraviolet and visible wavelength range (200 nm-650 nm), meaning that at least 99 percent of the incident light is blocked within a 1 cm distance of the entry point of light into the food material. In the context of comminuted peanut solids, a 1 mm thick coating of typical peanut butter has an optical density well in excess of 2 throughout the above wavelength range of light. Therefore, even without other food solids present, a 10 percent concentration of peanut butter in a food that is 1 cm thick is more than sufficient to block 99 percent of the incident light.

DETAILED DESCRIPTION OF THE INVENTION

A first aspect of the invention contemplates a food composition that contains a triglyceride-based edible oil portion comprising about 4 to about 100 weight percent of the composition in which triglycerides containing omega-3 fatty acids (and other fatty acids) are present and are stabilized against oxidation in the absence of encapsulation. Thus, the microencapsulation taught in Kantor et al. U.S. Pat. No. 4,895,725 is neither needed nor present in a contemplated composition to achieve stabilization toward oxidation. Overall, the fatty acid portion of the oil in the food composition includes less than about 10 percent by weight linoleic acid, at least 75 percent by weight of monounsaturated plus saturated fatty acids, and at least 3 percent by weight omega-3 fatty acids.

A food composition that contains 100 weight percent of an above oil is an edible oil, and can be used for frying, mayonnaise, in cheese, in margarine or similar spread, and as a salad dressing. Where less of the oil is present, a food composition that contains peanut solids such as peanut butter, peanut spread or peanut oil-containing food composition is contemplated.

The food composition is preferably a mixture of edible oils that includes about 4 to about 98 percent by weight of a peanut oil that contains less than 10 percent by weight linoleic acid. That peanut oil, also termed "low linoleic acid" peanut oil herein, more preferably contains less than about 7 (not more than about 7 percent) percent by weight linoleic acid based upon the fatty acid content of the peanut oil. The food composition also includes a triglyceride-based omega-3 fatty acid enriching oil containing at least about 10 percent omega-3 fatty acids.

In a related aspect, a food composition is provided in which non-encapsulated omega-3 fatty acids are stabilized against oxidation, including photooxidation. The food composition preferably includes about 4 to about 98 percent by weight of a peanut oil containing less than 10 percent by weight linoleic acid (based upon the total fatty acid content of the peanut oil), an amount of optically opaque food material that includes comminuted peanut solids sufficient to cause the optical density of the food composition to be greater than 2.0, and a triglyceride-based omega-3 fatty acid enriching oil containing at least 10 percent omega-3 fatty acids (based upon the total fatty acid content of the enriching oil). The fatty acid portion of the oil in this completed food composition includes less than 15 percent by weight linoleic acid, at least 75 percent by weight of monounsaturated plus saturated fatty acids, and at least 1 percent by weight omega-3 fatty acids. Another embodiment of this aspect of the invention includes less than 10 percent by weight linoleic acid, at least 75 percent by weight of monounsaturated plus saturated fatty acids, and at least 3 percent by weight omega-3 fatty acids. In one embodiment, the food composition is a peanut butter, a peanut spread, a food containing peanut butter or a food containing peanut spread that includes about 30 to about 60 percent by weight of this peanut oil.

A contemplated food product of the present invention such as a peanut butter is preferably fortified with biologically active micronutrients, in which the peanut butter is made from varieties of peanuts containing an elevated proportion of oleic acid and a diminished proportion of linoleic acid. Such peanut butter has been shown to increase the stability of exogenously introduced omega-3 fatty acids including alpha-linolenic acid, DHA (docosahexaenoic acid), EPA (eicosapentaenoic acid), and/or antioxidants, against rancidity and/or oxidation.

Each serving of such a high oleic peanut butter is also preferably fortified with the RDI levels of vitamins C (ascorbyl palmitate), E and D. Because these vitamins are either naturally fat-soluble (or made fat-soluble), it is logical to incorporate one or more of them into a fat-based food product such as peanut butter. Moreover, as antioxidants, vitamins C and E help protect omega-3 fatty acids against oxidation. Vitamin E also helps sustain a healthy immune response, and has been shown to protect against a decline in immune function commonly associated with aging. Loss in immune function appears to contribute to the increased incidence of cancer in the aging individual. Vitamin E also helps protect cell membranes and living tissues, as well as LDL cholesterol, against harmful oxidation. Vitamin D is important in assisting the absorption of calcium, and calcium is also preferably provided in the product.

A contemplated food product can also include a "vitamin precursor"; i.e., a compound that is converted in vivo into a vitamin. Such precursors are sometimes referred to in the art as "vitamers". Goodman et al., "Fat-Soluble Vitamins", *The Pharmacological Basis of Therapeutics*, $8^{th}$ ed., pg. 1524 (1993). Exemplary vitamin precursors or vitamers include 1-α-hydroxycholecalciferol and 25-hydroxycholecalciferol (25-HCC) are precursors of 1,25-dihydroxychole-calciferol [vitamin 1,25-$(OH)_2D_3$] and retinol esters that are precursors of retinol and retinoic acid (vitamin A), and pyridoxal and pyridoxamine that are precursors of pyridoxine (vitamin $B_6$).

In another related aspect, the above food composition is exposed to light and air, and because the comminuted peanuts are substantially opaque to light, the composition provides greater resistance of the omega-3 fatty acids to oxidation including photooxidation, than the resistance provided by the same food composition lacking comminuted peanuts.

In preferred practice, the above food composition includes comminuted peanuts obtained from a peanut seed variety whose endogenous oil contains less than 10 percent by weight linoleic acid. In a more preferred embodiment, the endogenous oil contains less than about 7 percent by weight linoleic acid.

In a preferred embodiment, the above-mentioned omega-3 enriching oil provides the omega-3 fatty acid, alpha-linolenic acid. The omega-3 enriching oil includes one or both of flax oil and canola oil. Perilla oil can also be utilized.

In a related embodiment, the omega-3 enriching oil includes a fish oil or other edible marine oil, wherein the omega-3 enriching oil provides one or both of the omega-3 fatty acids, DHA and EPA. In this embodiment, the omega-3 enriching oil provides at least one omega-3 fatty acid selected from the group consisting of alpha-linolenic acid, DHA, EPA and mixtures thereof (i.e., one or more of alpha-linolenic acid, DHA and EPA).

The omega-3 enriching oil contributes about 1 to about 20 percent by weight omega-3 fatty acids to the food composition based upon the total fatty acid content of the oils in the food composition. It is preferred that alpha-linolenic acid comprise that about 1 to about 20 percent by weight to the food composition based upon the total fatty acid content of the oils in the food composition. The omega-3 enriching oil is preferably flax oil.

Based upon the total fatty acid content of oil itself or the oil portion of the enriched food composition includes less than 15 percent by weight linoleic acid, at least 75 percent by weight of monounsaturated plus saturated fatty acids, and at least 1 percent by weight omega-3 fatty acids. Preferably, about 3 to about 20 percent by weight of the fatty acids are alpha-linolenic acid, not more than about 10 percent by weight are linoleic acid (18:2), and at least 75 percent by weight are monounsaturated oleic acid (18:1) plus saturated fatty acids such as lauric, myristic, palmitic and stearic acids. More preferably, in addition to the alpha-linolenic acid content of the fatty acids, not more than about 7 percent of the fatty acids are linoleic acid, with the remainder being oleic acid and the saturated fatty acids. Most preferably, not more than about 5 percent of the fatty acids are linoleic acid, with the remainder being linolenic or other omega-3 fatty acids, oleic acid and the saturated fatty acids.

Expressed in somewhat different terms, the amount of linoleic acid in the oil portion of the composition is preferably not more than twice as great as the amount of alpha-linolenic acid. Most preferably, the amount of linoleic acid in the oil portion of the composition is equal to or less than the amount of alpha-linolenic acid, or other omega-3 fatty acid.

It is found that limiting both the 18:2 content and the 18:3 content of the fat are necessary to achieve adequate chemically stability of the composition against oxidation. That is, increasing the content of either 18:2, 18:3, or both 18:2 and 18:3 in the composition appears to geometrically accelerate oxidative rancidity development in the composition. The dramatic acceleration in oxidation rate suggests a second or higher order chemical reaction among the reactive species in the composition.

The 18:3 can be provided by any edible triglyceride-based oil that contains a useful concentration of alpha-linolenic acid such as flax oil (principally produced in Canada) containing approximately 60 percent by weight alpha-linolenic acid, or a high alpha-linolenic acid content canola oil containing 20-30 percent by weight alpha-linolenic acid, or alternatively an alpha-linolenic acid-containing oil such as flax oil that has been enzymatically interesterified with either a monounsaturated fat, or a mixture of monounsaturated and saturated fats, or oleic acid, or a mixture of oleic acid and saturated fatty acids. This enzymatic interesterification permits alpha-linolenic acid to persist in the sn-2 position of the triglyceride molecule, while replacing most alpha-linolenic acid in the sn-1 and sn-3 positions with either oleic acid or a saturated fatty acid.

In preferred embodiments of the invention, the food composition contains one part by weight of a flax oil that is a rich source (containing at least 20 percent by weight) of alpha-linolenic acid (18:3), blended with at least four parts by weight of an oxidation-resistant peanut oil, and an appropriate amount of comminuted peanut solids. In an illustrative composition, alpha-linolenic acid of flaxseed oil accounts for approximately 57 percent of the fatty acid content. A useful peanut oil contains a low concentration (not more than 12 percent by weight) of linoleic acid (18:2) and a high concentration (at least 83 percent by weight) of the combination of monounsaturated oleic acid (18:1) plus saturated fatty acids including lauric (12:0), myristic (14:0), palmitic (16:0) and stearic acids (18:0) that are resistant to oxidation. The proportion by weight of alpha-linolenic acid in the resulting oil blend is not more than about 20 percent, and the content of linoleic acid in the blend is not more than 15 percent by weight, and preferably not more than 10 percent by weight. In this manner, and according to the present invention the oil blend provides a remarkably stable chemical environment for storing and delivering alpha-linolenic acid, whereas the flaxseed oil alone in its undiluted state is rapidly oxidized and becomes rancid. The components of a blended oil can typically be determined using FT-Raman spectroscopy as discussed in Weng et al., 2003 April, *Appl. Spectrosc.*, 57(4):413-418.

Given the oxidative stability of high oleic peanut butter, one can add a significant amount of alpha-linolenic acid without producing a very perishable product. For example, fortifying the peanut butter with 8 percent by weight flax oil (equivalent to peanut oil fortified with 16 percent flax oil, where the flax oil contains approximately 60 percent alpha-linolenic acid, and therefore contributes almost 10 percent omega-3 fatty acids to the peanut oil) still provides a surprisingly oxidation-resistant product.

Because peanut butter contains approximately 50 percent by weight peanut oil, one 32 g serving of the above peanut butter provides 1600 mg of dietary alpha-linolenic acid. By comparison, 150 g of French fries absorbing approximately 7 percent by weight canola oil during frying (where canola oil contains 9 percent by weight alpha-linolenic acid) provides 950 mg of dietary alpha-linolenic acid.

In a related aspect, the above food composition further includes non-fat yet fat-soluble food additive in the food composition. In a preferred embodiment, these additives include fat-soluble vitamins, fat-soluble vitamers (supra), fat-soluble bioflavonoids or polyphenols, e.g., quercetin, rutin, quercitrin, hesperidin, catechin, as well as mineral supplements (e.g., calcium phosphate or calcium carbonate and selenium) as well as vitamin C palmitate, vitamins D, E (alpha-, beta-, gamma- and delta-tocopherol), the four corresponding tocotrienols, and vitamin K, and a carotenoid that is a hydrocarbon (a carotene) such as α-carotene, β-carotene or lycopene, or is an oxygenated carotenoid (a xanthophyll) such as lutein, zeaxanthin or astaxanthin. Substances appear to be stabilized against oxidation by the peanut oil's reduced content of linoleic acid, and by refrigeration. To further stabilize an omega-3-fortified oil-containing food composition, the composition can be purged of oxygen using nitrogen gas for example, or the composition can be supplemented with antioxidants such as TBHQ, and/or sealed with oxygen-excluding packaging.

Addition of solid vegetable stearin and/or mono- and di-glycerides to the peanut butter can prevent oil separation. These traditional stabilizers contain either partially hydrogenated vegetable oil or saturated fats, both of which tend to elevate plasma LDL cholesterol levels. However, refrigeration is preferably used to control oil separation.

In another aspect of this invention, a method is provided for stabilizing omega-3 fatty acids against oxidation. The method comprises admixing an initial food composition that includes about 4 to about 98 percent by weight of a vegetable oil such as peanut oil that contains less than 10 percent by weight linoleic acid based upon the fatty acid content of the peanut oil, with at least one triglyceride-based omega-3 enriching oil that provides omega-3 fatty acids in the absence of encapsulation, to provide an enriched food composition. The oil portion of that enriched food composition contains less than about 10 percent by weight linoleic acid, at least 75 percent by weight of monounsaturated plus saturated fatty acids, and at least 3 percent by weight omega-3 fatty acids based upon the fatty acid content of the oil in the enriched food composition. The enriched food composition is resistant to oxidation.

In a related aspect, this method further includes providing an amount of comminuted peanuts that is substantially opaque to light to provide an optical density of at least 2.0 to form a slightly different enriched food composition. Here, the oil portion contains less than about 15 percent by weight linoleic acid, at least 75 percent by weight of monounsaturated plus saturated fatty acids, and at least 1 percent by weight omega-3 fatty acids based upon the fatty acid content of the oil in the enriched food composition. This method can also utilize an oil portion that contains less than about 10 percent by weight linoleic acid, at least 75 percent by weight of monounsaturated plus saturated fatty acids, and at least 3 percent by weight omega-3 fatty acids, or another previously discussed oil portion. The omega-3 fatty acids are protected from photooxidation by to opacity provided by the comminuted peanuts.

In still another aspect of this invention, a method is provided for stabilizing omega-3 fatty acids against air and light-associated oxidation in the absence of encapsulation as taught in Kantor et al. U.S. Pat. No. 4,895,725. The method comprises admixing a substantially opaque food composition that includes about 4 to about 98 percent by weight of a peanut oil that contains less than about 10 percent by weight linoleic acid based upon the fatty acid content of the peanut oil, in which the food composition includes comminuted peanuts, with at least one triglyceride-based omega-3 enriching oil that provides omega-3 fatty acids, to produce an omega-3 enriched food composition containing an oil portion that has less than about 10 percent by weight linoleic acid, at least 75 percent by weight of monounsaturated plus saturated fatty acids, and at least 3 percent by weight omega-3 fatty acids, an oil portion that has less than about 10 percent by weight linoleic acid, at least about 75 about by weight of monounsaturated plus saturated fatty acids, and at least about 3 percent by weight omega-3 fatty acids, or another previously discussed oil portion. The fatty acid portions are based upon the fatty acid content of the fat in this enriched food composition, as previously discussed.

A contemplated oxidation-stabilized oil is a blend of an omega-3 enriching oil with one or both of two classes of oxidation-resistant oils:

(i) the "low linoleic-high oleic" oils that include high oleic peanut oil, high oleic sunflower oil, and olive oil, and (ii) the "low linoleic-high saturates" that include cocoa butter, coconut oil, palm kernel oil, and palm oil.

For nutritional purposes such as for control of plasma LDL cholesterol levels when it is desirable to control the consumption of saturated fats, it can be preferable to utilize oxidation-resistant oils of class (i). On the other hand, when the use of high saturates is indicated, palm oil and cocoa butter can have an advantage over coconut oil and palm kernel oil in that their levels of myristic acid (14:0) are much lower. Myristic acid consumption has been generally recognized as a contributor to hypercholesterolemia. Preferably, the oxidation-resistant oil is a high oleic-low linoleic acid vegetable oil in which the weight ratio of oleic acid to linoleic is approximately 10:1 or greater.

Flaxseed oil is provided as an example of an omega-3 enriching oil. The approximate distribution of total fatty acids in a typical commercial flaxseed oil was as follows: 57 percent alpha-linolenic acid, 15 percent linoleic acid, 19 percent oleic acid and 9 percent (palmitic +stearic) saturated fatty acids.

By contrast, a typical high oleic acid-low linoleic acid vegetable oil can contain about 1 to about 9 percent linoleic acid, about 60 to about 90 percent oleic acid, no omega-3 fatty acids and about 10 to about 15 percent by weight saturated fatty acids. For example, olive oil typically contains about 6 percent linoleic acid, about 80 percent oleic acid, and about 12 percent saturates, whereas recently developed high oleic peanut oils contain about 1.5 to about 8 percent linoleic acid and about 74 to about 84 percent oleic acid, no omega-3 fatty acid, and the balance being saturated fatty acids.

The oil from conventional peanuts contains about 46 percent by weight oleic acid and approximately 32 percent by weight linoleic acid, (and approximately 17 percent by weight mixed saturated fatty acids). However, the high oleic, low linoleic acid peanut oil described by Moore in U.S. Pat. No. 5,945,578 contains about 80 to about 85 percent oleic acid and only about 1.5 to about 2.5 percent linoleic acid. The high oleic acid, low linoleic acid peanut oil described by Knauft et al. in U.S. Pat. No. 6,121,472 contains about 74 to about 84 percent oleic acid and only about 2 to about 8 percent linoleic acid, whereas the high oleic acid, low linoleic acid peanut oil of Horn et al. in U.S. Pat. No. 6,214,405 contains about 78 to about 82 percent oleic acid and only about 2.8 to about 4.9 percent linoleic acid.

Given the above parameters of composition, the linoleic acid content in a blended oil composition containing, for example, 10 percent flaxseed oil and 90 percent high oleic peanut oil is considerably less than 10 percent and can be as little as 3 percent by weight. The alpha-linolenic acid content in a blended oil is typically about 3 percent to about 12 percent, and the ratio of alpha-linolenic acid to linoleic acid in the blend is preferably about 1:2 to about 10:1.

High quality flaxseed oil (e.g., cold-pressed organically certified flaxseed oil) is approved for use as a nutritional supplement (e.g., ingested in capsules) but not as a food additive in a number of countries including the U.S. The fact that flaxseed oil has not yet been approved in the U.S. as generally recognized as safe (GRAS) for addition to foods is remarkable in light of the fact that the flaxseed grain source providing the oil is considered GRAS in the U.S., and is added to foods. These seeming inconsistencies are not resolved by the fact that fish oils (even more perishable than flaxseed oil) are GRAS-approved in the U.S. and can be added to foods as well as consumed in nutritional supplements.

According to the present invention, vegetable oils such as flaxseed oil that have poor oxidative stability and that contain high levels of omega-3 fatty acids, particularly alpha-linolenic acid (abbreviated 18:3), are blended and diluted with other vegetable oils (e.g., high oleic vegetable oils) that have excellent oxidative stability owing to their very low levels of linoleic acid (18:2). This blending permits the alpha-linolenic fatty acids (and any 18:2 fatty acids also present) to be diluted into a vegetable oil that is stable and slow to oxidize. Such dilution might be expected to cause a linear decrease in the rate of oxidation of 18:3 fatty acids. Indeed, when flaxseed oil is diluted into a typical vegetable oil (soybean oil) containing substantial levels of linoleic acid, the rate of oxidation of 18:3 appears to decrease as a linear function of the decreasing amount of flaxseed oil to the vegetable oil.

In contrast to the above observation, when flaxseed oil is successively diluted into a high oleic-low linoleic peanut oil containing approximately 85 percent oleic acid and only 2 percent linoleic acid, a remarkable decrease in the rate of 18:3 oxidation is detected. Rather than a linear decrease, an exponential decrease occurs in the rate of 18:3 oxidation as a function of decreasing concentration of 18:3 added to the vegetable oil. In fact, the oxidation rate appears to be proportional to the square of the concentration of 18:3 added to the oil. This surprising observation has important consequences because it permits alpha-linolenic acid to be stabilized against oxidation and thereby provided in the human diet by diluting an alpha-linolenic acid-rich oil such as flaxseed oil with a vegetable oil having a suitably low level of linoleic acid.

Use of such a linoleic acid-depleted vegetable oil for storing and delivering dietary alpha-linolenic acid might be considered unwise because 18:2 is an essential fatty acid as well as 18:3. Linoleic acid, however, is far more abundant and available in contemporary foods, and is more stable than alpha-linolenic acid in a usual food environment. Therefore, an individual's nutrition will not suffer from using a linoleic acid-depleted vegetable oil to dilute, stably store, and deliver alpha-linolenic acid into the mammalian diet.

The peanut seed like other plant seeds, provides a stable reservoir of nutrients, e.g., fats, proteins and carbohydrates, as well as micronutrients such as vitamins, that permit the peanut to germinate even after a long dormancy, and grow into a viable seedling. When edible plant seeds such as peanuts are roasted, peeled and comminuted, much of the oxidative stability of the nutrients in the seeds is lost. It is believed that a significant component of this stability loss is due to the release of oils; i.e., edible vegetable oils such as peanut oil, which become more susceptible to oxidation and rancidity during exposure to air.

The high level of unsaturated fatty acids present in peanuts and other plant seeds and nuts is an important component of this oxidative instability. It is believed that if it were not for the high level of linoleic acid in edible seed and nut butters, these butters containing high levels of triglycerides (e.g., typically about 50 percent by weight fat in peanut butter) and natural antioxidants, could be excellent storage and delivery vehicles for certain fat-soluble nutrients (e.g., omega-3-containing fats and oils) and micronutrients (e.g., fat-soluble vitamins) which themselves, are very susceptible to oxidation.

Specially bred or selected varieties of oil-producing plants, e.g., varieties of peanuts and soybeans that produce reduced levels of linoleic acid in their seeds can be used to manufacture seed and nut butters that serve as edible carriers for non-fat fat-soluble bioactive food additives, nutrients and micronutrients for human nutrition. Although linoleic acid is an essential fatty acid in human nutrition, and is desirable in many foods, it is considered a co-oxidant with alpha-linolenic acid, and is therefore undesirable in food compositions of the present invention.

The bioactive food additives and/or micronutrients can be partitioned into separate items of manufacture if these additives or nutrients tend to chemically react with each other or otherwise reduce each other's shelf life. For example, a natural antioxidant such as vitamin E is beneficial, yet two different antioxidants, e.g., ascorbyl palmitate, and alpha-tocopherol when mixed together, can react with each other because they possess different oxidation potentials. In the context of the present invention, mixing a vegetable oil containing a substantial level of linoleic acid (e.g., about 20-60 percent by weight) with another vegetable oil that contributes alpha-linolenic acid can be undesirable because second order chemical oxidation kinetics involving free radicals produced in linoleic acid molecules can accelerate the degradation (peroxidation) of the less stable alpha-linolenic acid molecules.

The relative rates of oxidation of polyunsaturated fatty acids in different fat environments are often impossible to predict (see U.S. Pat. No. 5,382,442 and No. 5,874,117). Nevertheless, it is known to those skilled in the art that fats containing higher levels of polyunsaturated fatty acids have reduced oxidative stabilities, and are susceptible to developing rancidity. Furthermore, fats containing alpha-linolenic acid with three sites of unsaturation are thought to be between 2- and 5-fold more susceptible to oxidation than are fats containing comparable amounts of linoleic acid with two sites of unsaturation. This oxidative susceptibility is still more problematic for polyunsaturated fatty acids having more than three sites of unsaturation, e.g., the marine oils, DHA and EPA.

Although it is understood that a vegetable oil high in oleic acid, e.g., an oil that contains about 1 to about 9 percent linoleic acid, about 60 to about 90 percent oleic acid, no omega-3 fatty acids and about 10 to about 15 percent by weight saturated fatty acids, is itself less susceptible to rancidity than most regular vegetable oils, there is no suggestion in the art that an oil-containing food composition such as a peanut butter containing a peanut oil with a low level of linoleic acid can serve as either: (i) a stabilizing vehicle for added oils containing high levels of omega-3 fatty acids, or (ii) a stabilizing vehicle for nutrients and micronutrients that can be susceptible to oxidation, e.g., tocopherols and other biologically active food additives. The art also does not report the blending of a vegetable oil that contains less than, for example, about 10 percent linoleic acid based upon its fatty acid content, with an oil that contains a high level, e.g., about 20 percent to about 60 percent or more, of alpha-linolenic acid.

According to the present invention, an amount of an edible enriching oil that is rich in omega-3 (e.g., flax oil containing 50-60 percent alpha-linolenic acid, or a marine oil providing DHA and EPA) that is sufficient to provide about 1 or preferably about 3 to about 20 percent by weight omega-3 fatty acids to the food composition based upon the total fatty acid content of the oils in the food composition can be conveniently combined with a low linoleic acid-containing peanut oil or other oil, a peanut butter, or peanut spread in which the peanut oil contains a low level, e.g., 2, 4, 8 or 10 percent and less than 15 percent where peanut solids are also present, of linoleic acid to create a product that has considerable oxidative stability. Surprisingly, the resulting oxidative stability of omega-3 fortified, low linoleic acid peanut oil was found to be as good as, or better than the oxidative stability of conventional peanut oil alone (see Example 3 below).

The discovery that the chemical environment in a low linoleic acid content peanut butter is better than either a simple vegetable oil or alternatively an aqueous food environment as described in the prior art literature for stabilizing omega-3 fatty acids and other antioxidants is surprising. It is hypothesized that a number of independent physical and chemical factors acting in peanut butter of the present invention combine and cooperate to protect these substances that are perishable in air.

There are a number of reasons why the observed stabilization is surprising. For example, an aqueous vehicle such as yogurt or milk might be expected to be a better dietary vehicle for preventing oxidation of omega-3s than peanut butter. For example, in relation to oxidative rancidity, the Canola Council of Canada states on its web site at canola-council.org/pubs/Chemical17-12.pdf:

"Oxidation of unsaturated lipids produces components that behave as catalysts for this process, making it autocatalytic. Generally oxidation occurs when oxygen is present in an oil or in the head-space above the oil. Solubility of oxygen in oil is about three to five times greater than in water."

Thus, it is surprising that a vegetable oil environment is a suitable environment for storing and delivering antioxidants and omega-3 fatty acids. If all other oxidative influences were equal, one would conclude that vegetable oil would be greatly inferior to a water emulsion as a vehicle for stabilizing oxygen-reactive substances.

Indeed, the oxygen addition reaction with conjugated dienes that are produced during omega-3 oxidation is a second order reaction that accelerates directly as a function of dissolved oxygen concentration. There are numerous patents that teach the use of aqueous vehicles rather than oils for formulating and storing omega-3s. However, water can be expected to accelerate hydrolytic rancidity compared to oil, so that overall, water would be a grossly inferior environment for maintaining the integrity of any triglyceride molecule.

Improved oxidative stability of fats composed of cholesterol-reduced saturated animal fats such as tallow blended with any one of a variety of vegetable oils has been previously demonstrated (Perlman et al., U.S. Pat. No. 5,624,703). Addition of vegetable oil has the unusual property of increasing the oxidative stability of the otherwise unstable cholesterol-reduced tallow. Improved oxidative stability of fats composed of polyunsaturated vegetable oil such as corn oil blended with saturated vegetable oils such as palm oil has also been described (Perlman et al., U.S. Pat. No. 5,874,117). Vegetable oil blends such as these containing an approximately equal amounts of polyunsaturated and saturated fatty acids, have been substituted for regular dietary fat, and have the unusual and beneficial property of increasing the HDL cholesterol level and the ratio of HDL to LDL cholesterol in the human blood.

Other patents described above combine fats such as fish oil containing omega-3 fatty acids with a variety of monounsaturated vegetable oils; i.e., those oils containing high levels of oleic acid such as olive oil and canola oil. Although high levels of oleic acid are compatible with omega-3 fatty acid stability, high levels of the saturated fatty acids are also compatible with omega-3 fatty acid stability.

In fact, another parameter that is more important to omega-3 fatty acid stability has been found in conjunction with this invention; namely, the elevated levels of linoleic acid found in regular vegetable oils. These levels must be significantly reduced because linoleic acid appears to act as a co-oxidant and possibly a catalyst that accelerates the rate of oxidation of the omega-3 fatty acids. Thus, in Bracco et al., olive oil which is suggested as a vehicle for fish oil still contains 20-35 percent linoleic acid, and within the present teachings, this level is excessive for achieving omega-3 fatty acid stability.

In the present invention, a different method and different composition are involved in stabilizing alpha-linoleic acid against oxidation. More specifically, 18:2 linoleic acid and 18:3 alpha-linolenic acid are both essential dietary fatty acids. Therefore, humans must consume foods containing both of these fatty acids because the body does not synthesize them. They are needed for building the cellular and subcellular architecture of living tissue.

Because both of these fatty acids are considered to be important components of a "healthy" diet, normally there would not be a reason to reduce the level of 18:2, while selectively increasing the level of 18:3 in an oil or oil-containing food. To the contrary, because 18:3 is significantly more susceptible to rancidity than 18:2 in vegetable oils, it has been a common practice in plant breeding to select plant strains that produce less rather than more 18:3.

Thus, improved plant varieties for producing oxidation-resistant canola oils used in deep frying (e.g., Clear Valley® 75 and 85 oils) are being used by the Cargill Company (Minneapolis, Minn.). These canola oils contain reduced levels of 18:3; i.e., about 2-4 percent, rather than the typical level of about 9-11 percent in conventional canola oil. The level of 18:2 in these low 18:3 oxidation-resistant oils; e.g., about 6-12 percent, is approximately 3-fold greater than the 18:3 levels.

In the present invention, nearly the opposite pattern of fatty acids is established in the fats. That is, the proportion of 18:2 is diminished to as low a level as possible, with the level of 18:3 preferably being increased to a level greater than the 18:2 level.

It has rather been found that as the concentration of 18:2 in a fat is increased, the rate of fat oxidation increases dramatically and disproportionately. Accordingly, the proportion of 18:2 fatty acids should not exceed about 15 percent, and preferably should not exceed 10 percent by weight, and more preferably 7 percent of the total fatty acids in the oil portion composition. If possible, the proportion of 18:2 fatty acids located outside of the sn-2 position (i.e., in the sn-1 and sn-3 positions) of triglycerides in the composition is kept to a minimum because these "non-bioactive" 18:2 fatty acids can co-oxidize 18:3 fatty acids at the sn-2 location.

Unlike canola oil in which most of the alpha-linolenic acid is at the sn-2 position, some fats such as flax oil can contain alpha-linolenic acid esterified at all three positions of the triglyceride molecules. Enzymatic interesterification of the flax oil with oleic acid (or a with high oleic acid content fat) can be used to selectively cleave and eliminate alpha-linolenic acid at the non-bioactive sn-1 and sn-3 positions. Finally, the alpha-linolenic acid content in the composition can be protected against otherwise rapid oxidation by diluting the 18:3-containing fat with monounsaturated fats; i.e., fats having a high content of oleic acid (18:1) and a low content of 18:2 such as high oleic canola, safflower, sunflower oils that are commercially available from the Cargill Company (Minneapolis, Minn.) and from the Archer Daniels Midland Company (Decatur, Ill.), even high oleic peanut oil or butter as discussed before.

The composition includes a quantity of flax oil or other oil rich in alpha-linolenic acid that is perishable via oxidation in air, blended with a larger quantity of oxidation-resistant vegetable oil that is rich in oleic acid (18:1) and that contains a reduced level of linoleic acid (18:2); i.e., no more than 10 percent by weight linoleic acid. The blended composition provides a remarkable chemical environment for stabilizing alpha-linolenic acid that would otherwise be highly susceptible to oxidation and rancidity.

The rate of oxidative loss of omega-3 alpha-linolenic acid (e.g., from flaxseed oil) and the longer chain omega-3 fatty acids, DHA and EPA (e.g., from fish oil) in peanut butters can be conveniently determined by GLC (gas-liquid chromatography). It is believed that such oxidation in fats and oils follows second order reaction kinetics proportional to the square of the concentration of polyunsaturated fatty acids. A second order oxidation process may explain why the rate of oxidative loss is markedly lower in low linoleic/high oleic acid-containing peanut butter than in regular peanut butter. Likewise, the rate of oxidative loss of vitamin E (e.g., from soybean oil) measured by HPLC (high performance liquid chromatography) and loss of other antioxidants should be markedly lower in low linoleic acid/high oleic peanut butter than in regular peanut butter.

Preferred Embodiments

EXAMPLE 1

Low Linoleic Acid Peanut Oil Provides Oxidative Protection for Flax Oil's Alpha-linolenic Acid A study was designed to assay whether a low linoleic acid peanut oil (abbreviated LLPO) would provide measurably better oxidative protection for flax oil than regular peanut oil (abbreviated RPO) that was commercially purchased (Planter's brand). The LLPO was prepared as follows: Applicant obtained high oleic Texas Medium raw shelled red skinned peanuts (2002 crop) from the Golden Peanut Company (Atlanta, Ga.). One pound of these peanuts were roasted at 300° F. for 30 minutes, cooled, the skins removed, and the peanuts were comminuted into a smooth style peanut butter without adding any other ingredients. The oil portion was recovered by high speed centrifugation or by solvent extraction.

A laboratory analysis of the fatty acid composition of the two oils provided the following distributions expressed as percentages of the total fatty acids:

Peanut Oil Fatty Acid Compositions

| | Oils | |
|---|---|---|
| | LLPO (%) | RPO (%) |
| Saturates | | |
| 16:0, 18:0, 20:0, 22:0, 24:0 | 12.8 | 17.7 |
| Monounsaturates | | |
| 18:1 (oleic) | 79.5 | 47.0 |
| 20:1 | 2.3 | 1.4 |
| Polyunsaturates | | |
| 18:2 (linoleic) | 4.2 | 33.6 |

Flax oil (organic Omegaflo™,) was obtained from Omega Nutrition USA, Inc. (Bellingham, Wash.) in a sealed opaque bottle and was kept refrigerated to prevent premature oxidation. The fatty acid distribution provided by the manufacturer was as follows:

| Flax Oil Fatty Acid Composition | |
|---|---|
| Saturates | |
| 16:0, 18:0, 20:0, 22:0, 24:0 | 8.5 |
| Monounsaturates | |
| 18:1 (oleic) | 28.4 |
| Polyunsaturates | |
| 18:2 (linoleic) | 17.0 |
| 18:3 (alpha-linolenic) | 46.1 |

One gram samples of the above two peanut oils (RPO and LLPO, as well as each of these peanut oils supplemented with 4 and 8 percent by weight flax oil were subjected to accelerated oxidation by heating them in an incubation oven for 16 hours at 250° F. in open vials (15 ml capacity Pyrex® glass). During this incubation period (after elapsed times of approximately 1, 2, 4, 7, 10, 13, and 16 hours), the samples were evaluated for their content of polar oxidation molecular species using a Food Oil Sensor (Northern Instruments Corporation). This instrument provides a relative dielectric reading of the oil, in which the numerical reading increases in direct proportion to the concentration of oxidized products. The instrument was adjusted to a zero reading using an oxidation-resistant high oleic sunflower oil (the "reference" oil) known as Odyssey™ 100 oil obtained from the Cargill Corporation. A negative numerical reading (see LLPO-based oils) indicates that the concentration of polar compounds in that oil was lower than the concentration in the reference oil. The following readings were recorded as a function of time.

| Oil | Time in Hours | | | | | | |
|---|---|---|---|---|---|---|---|
| | 1 | 2 | 4 | 7 | 10 | 13 | 16 |
| | Relative Dielectric Reading | | | | | | |
| RPO | 0.18 | 0.15 | 0.24 | 0.45 | 2.01 | >5 | — |
| RPO + 4% Flax | 0.31 | 0.31 | 0.41 | 0.73 | 2.63 | >5 | — |
| RPO + 8% Flax | 0.43 | 0.44 | 0.58 | 1.06 | 3.46 | >5 | — |
| LLPO | −0.81 | −0.84 | −0.87 | −0.87 | −.72 | −0.66 | −0.60 |
| LLPO + 4% Flax | −0.62 | −0.62 | −0.67 | −0.67 | −0.36 | −0.20 | −0.05 |
| LLPO + 8% Flax | −0.45 | −0.47 | −0.40 | −0.32 | +0.03 | 0.54 | 2.04 |

Regular peanut oil (RPO contains about 34 percent linoleic acid) underwent rapid oxidation commencing shortly after 7 hours of heating. When 8 percent flax oil was added to RPO, rapid oxidation commenced even before 7 hours had elapsed. Thus, the increase in dielectric reading was approximately 0.5 units between 4 hours and 7 hours when 8 percent flax oil was added, whereas the increase was only 0.2 units for the peanut oil alone during the same period. However, low linoleic acid peanut oil (LLPO peanut oil contained only 4.2 percent linoleic acid) showed little measurable oxidation during the 16 hour time course of the study, and when 8 percent flax oil was added to the LLPO, rapid oxidation was delayed until approximately 13 hours had elapsed. There is little question that LLPO provides a chemical environment that is far more stabilizing than RPO for the oxidation-prone omega-3 fatty acids found in flax oil.

EXAMPLE 2

A High Oleic Acid-low Linoleic Acid Unsweetened Peanut Butter Composition Fortified with Antioxidants, Omega-3 Fatty Acids, and Calcium This formulation provides approximately the following amounts of micronutrients in a single serving (32 g) of peanut butter:

To 29 grams low linoleic acid (high oleic acid) content roasted peanuts add:

0.30 grams salt (providing 120 mg sodium)

30 mg or 30 IU vitamin E, e.g., soy mixed tocopherols from ADM (100% of RDI)

30 mg ascorbyl palmitate (25% of RDI)

1.0-1.5 grams calcium carbonate, e.g., CalEssence™ 80-Specialty Minerals, Inc. (40-60% of RDI)

2.5 µg vitamin D (25% RDI)

1.0 gram flaxseed oil (providing about 600 mg omega-3 alpha-linolenic acid)

(optional) 0.80-0.15 grams mineral silica (EH-5 Cabosil® fumed silica anticaking agent, controlling the texture and "hardening" the product (optional) 30 mg mixed tocotrienols

EXAMPLE 3

Flax Oil Stabilized Against Oxidation by Dilution into Peanut Butter with Low Levels of Linoleic Acid Oil Low linoleic acid-containing peanuts were obtained, roasted and comminuted into a smooth style peanut butter as in Example 1 except they were from the 2003 rather than the 2002 Texas harvest. For comparison purposes, a somewhat coarser, so-called "natural" style of regular peanut butter (no stabilizers or additives other than salt) that had been recently manufactured by the J. T. Smucker's Company (Ohio) was purchased and briefly re-comminuted to match the smooth texture of the first peanut butter.

Three samples (100 g each) from each of the two peanut butter were supplemented with either zero, 4% or 8% by weight of fresh flax oil. These six samples of peanut butter were tested at NP Analytical Laboratories (St. Louis, Mo.) for oxidative stabilities at 110 C. A protocol to measure relative OSI (Oxidative Stability Index) values was established in which all six peanut butters were mixed with an equal weight of inert mineral oil and pre-heated at 110 C for one hour to drive off any peanut volatiles before commencing the OSI test. The test determines how many hours of heating (with controlled exposure to oxygen) are required for the oil (or blend of oils) in the peanut butter to reach induction, defined as the time at which the rate of evolution of volatile chemically polar breakdown products (e.g., aldehydes, etc.) from the oxidizing peanut and flax polyunsaturated fatty acids rapidly increases. The results reported were as follows:

| OSI Values for Peanut Butters from | Percentage Flax Oil Added to Peanut Butter | | |
|---|---|---|---|
| | Zero | 4 | 8 |
| | Hours to Induction | | |
| Regular Peanuts (Smucker's Natural) | 33 | 30 | 26 |
| Low Linoleic Acid (4.2%) Peanuts | >100 | >100 | 90 |

The blend of 8 percent flax oil and 92 percent regular peanut butter had an oxidative stability; i.e., OSI, of 26 hours. This represented an approximate 20 percent decrease in stability for the peanut butter that had an initial OSI of 33 hours. The low linoleic/high oleic acid content peanut butter provided a far more stable environment for the flax oil. With an initial OSI of greater than 100 hour (at least 3-fold greater than regular peanut butter, the OSI value modestly decreased to 90 hrs when 8 percent flax oil was added. This is still a very high OSI, and is comparable to that of a very stable frying oil. These results suggest that flax oil and other omega-3-containing fatty acids can be diluted into low linoleic acid content peanut butters (or low linoleic acid content peanut oils-see Example 1) with very little concern that the omega-3 fatty acids will oxidize or become rancid.

Because peanut butter contains approximately 50 percent by weight peanut oil, the addition of 8 percent by weight flax oil to the peanut butter translates to approximately 16 percent flax oil based upon the oil content. With flax oil containing approximately 60 percent by weight alpha-linolenic acid, the fortified peanut oil portion of the peanut butter contained over 9 percent omega-3 fatty acids (16%×60%). This is comparable to the omega-3 content of canola oil. However, the OSI value for canola oil is seldom greater than 15 hours.

It is therefore reasonable to conclude that the inferior oxidative stability of canola oil is due to the presence of moderate levels of linoleic acid (approximately 22 percent) in canola oil that co-oxidize with its omega-3 fatty acids. The superior oxidative stability of flax oil and its omega-3 fatty acids when diluted into low linoleic acid-content (4 percent by weight) peanut oil must be largely due to the very limited amount of co-reactive linoleic acid.

Each of the patents and articles cited herein is incorporated by reference. The use of the article "a" or "an" is intended to include one or more.

The foregoing description and the examples are intended as illustrative and are not to be taken as limiting. Still other variations within the spirit and scope of this invention are possible and will readily present themselves to those skilled in the art.

What is claimed:

1. A food composition that contains a triglyceride-based edible oil portion comprising about 4 to about 100 weight percent of the composition, in which triglycerides comprising glycerin esterified with alpha-linolenic acid at all three positions of the triglyceride molecule are stabilized against oxidation in the absence of encapsulation, wherein the fatty acid portion of said triglyceride-based edible oil portion in the food composition includes less than about 10 percent by weight linoleic acid, at least 75 percent by weight of monounsaturated plus saturated fatty acids, and at least 3 percent by weight omega-3 fatty acids.

2. The food composition according to claim 1 wherein said oil portion is a mixture of oils that includes about 4 to about 98 percent by weight of a peanut oil that contains less than 10 percent by weight linoleic acid.

3. The food composition according to claim 2 wherein said oil portion also includes a triglyceride-based omega-3 fatty acid enriching oil containing at least about 10 percent by weight omega-3 fatty acids.

4. The food composition according to claim 3 that further includes an amount of optically opaque food material that includes comminuted peanut solids sufficient to cause the optical density of the food composition to be greater than 2.0.

5. The food composition according to claim 4 that is a peanut butter, a peanut spread, a food containing peanut butter or a food containing peanut spread that includes about 30 to about 60 percent by weight of said peanut oil.

6. The food composition according to claim 3 wherein said enriching oil contributes about 1 to about 20 percent by weight omega-3 fatty acids to the food composition based upon the total fatty acid content of the oils in the food composition.

7. The food composition according to claim 6 wherein alpha-linolenic acid comprises said about 1 to about 20 percent by weight to the food composition based upon the total fatty acid content of the oils in the food composition.

8. The food composition according to claim 3 wherein said enriching oil is flax oil.

9. The food composition according to claim 1 that further includes a non-fat yet fat-soluble bioactive food additive.

10. The food composition according to claim 9 wherein said non-fat yet fat-soluble bioactive food additive is selected from the group consisting of a fat-soluble vitamin, a fat-soluble vitamer, a fat-soluble bioflavonoid or polyphenol, a mineral supplement, vitamin C palmitate, vitamin D, vitamin E (alpha-, beta-, gamma- and delta-tocopherol) and the four corresponding tocotrienols, and vitamin K, and a carotenoid that is a carotene or a xanthophyll.

11. The food composition according to claim 1 wherein said food composition is a triglyceride-based oil.

12. The food composition according to claim 11 wherein the fatty acids of said oil are comprised of about 3 to about 20 percent by weight of alpha-linolenic acid, not more than about 7 percent by weight of linoleic acid (18:2), and at least 75 percent by weight of monounsaturated oleic acid (18:1) plus saturated fatty acids.

13. The food composition according to claim 11 wherein not more than about 5 percent of the fatty acids are linoleic acid.

14. The food composition according to claim 1 wherein said omega-3 fatty acids in said omega-3 fatty acid-containing triglycerides include one or more of alpha-linolenic acid, docosahexaenoic acid and eicosapentaenoic acid.

15. A comminuted peanut-containing food composition that contains a peanut solids portion and a fatty acid-containing triglyceride oil portion, wherein said peanut portion comprises an amount of comminuted peanut solids sufficient to cause the optical density of the food composition to be greater than 2.0, and said fatty acid-containing triglyceride oil portion includes less than about 15 percent by weight linoleic acid, at least 75 percent by weight of monounsaturated plus saturated fatty acids, and at least 1 percent by weight omega-3 fatty acid, wherein said omega-3 fatty acid is present in triglyceride that comprises glycerin esterified with alpha-linolenic acid at all three positions of the triglyceride molecule.

16. The comminuted peanut-containing food composition according to claim 15 that includes about 30 to about 60 percent by weight peanut oil.

17. The comminuted peanut-containing food composition according to claim 15 wherein said oil portion also includes a triglyceride-based omega-3 fatty acid enriching oil containing at least about 10 percent by weight omega-3 fatty acids.

18. The comminuted peanut-containing food composition according to claim 17 wherein said enriching oil contributes about 1 to about 20 percent by weight omega-3 fatty acids to the food composition based upon the total fatty acid content of the oils in the food composition.

19. The comminuted peanut-containing food composition according to claim 18 wherein alpha-linolenic acid comprises said about 1 to about 20 percent by weight to the food composition based upon the total fatty acid content of the oils in the food composition.

20. The comminuted peanut-containing food composition according to claim 17 wherein said enriching oil is flax oil.

21. The comminuted peanut-containing food composition according to claim 15 that further includes a non-fat yet fat-soluble bioactive food additive.

22. The comminuted peanut-containing food composition of claim 15 that is selected from the group consisting of a peanut butter, a peanut spread, a food containing peanut butter, and a food containing peanut spread.

23. A triglyceride-based edible oil whose fatty acids include alpha-linolenic acid esterified at all three positions of the triglyceride molecule, wherein about 3 to about 20 percent by weight of said fatty acids are alpha-linolenic acid, and not more than about 10 percent by weight are linoleic acid (18:2), and at least 75 percent by weight are monounsaturated oleic acid (18:1) plus saturated fatty acids.

24. The edible oil according to claim 23 wherein not more than about 7 percent of the fatty acids are linoleic acid, with the remainder being linolenic or other omega-3 fatty acids, oleic acid and the saturated fatty acids.

25. The edible oil according to claim 24 wherein said other omega-3 fatty acids include one or both of docosahexaenoic acid and eicosapentaenoic acid.

26. The edible oil according to claim 23 wherein the amount of linoleic acid is not more than twice as great as the amount of alpha-linolenic acid.

27. The edible oil according to claim 23 wherein the amount of linoleic acid in the oil portion of the composition is equal to or less than the amount of alpha-linolenic acid.

28. The edible oil according to claim 23 wherein proportion by weight of alpha-linolenic acid is not more than about 20 percent, and the content of linoleic acid in the blend is not more than 7 percent by weight.

29. A method for stabilizing omega-3 fatty acids present in a vegetable oil of a food composition against oxidation that comprises admixing in the absence of encapsulation an initial food composition that includes about 4 to about 98 percent by weight of a vegetable oil that contains less than 10 percent by weight linoleic acid based upon the fatty acid content of the oil with at least one triglyceride-based omega-3 enriching oil that provides omega-3 fatty acids present in triglycerides that comprise glycerin esterified with alpha-linolenic acid at all three positions of the triglyceride molecule to provide an enriched food composition that contains less than about 10 percent by weight linoleic acid, at least 75 percent by weight of monounsaturated plus saturated fatty acids, and at least 3 percent by weight alpha-linolenic acid based upon the fatty acid content of the fat in this enriched food composition, in which this food composition is resistant to oxidation.

30. The method for stabilizing omega-3 fatty acids present in a vegetable oil of a food composition against oxidation according to claim 29 that further includes providing an amount of comminuted peanuts that are substantially opaque to light to provide an optical density of at least 2.0, thereby protecting the omega-3 fatty acids from photooxidation.

31. The method for stabilizing omega-3 fatty acids present in a vegetable oil of a food composition against oxidation according to claim 29 wherein said omega-3 fatty acids include one or more of alpha-linolenic acid, docosahexaenoic acid and eicosapentaenoic acid.

32. The method for stabilizing omega-3 fatty acids present in a vegetable oil of a food composition against oxidation according to claim 29, wherein said enriching oil is flax oil.

33. The method for stabilizing omega-3 fatty acids present in a vegetable oil of a food composition against oxidation according to claim 29, wherein said provided enriched food composition contains no more than about 7 percent by weight of linoleic acid.

34. The method for stabilizing omega-3 fatty acids present in a vegetable oil of a food composition against oxidation according to claim 29, wherein not more than about 5 percent of the fatty acids are linoleic acid.

35. An oxidation-resistant food composition that comprises a combination of at least two different triglyceride-based edible oils, wherein said edible oils together contain less than 10% by weight linoleic acid, at least 3% by weight omega-3 fatty acids that is alpha-linolenic acid and at least 75 percent by weight of monounsaturated plus saturated fatty acids, wherein at least one edible oil contains little to no omega-3 fatty acids, is resistant to oxidation and rancidity, and serves as a diluent for a second edible oil that is rich in alpha-linolenic acid and is susceptible to oxidation and rancidity, wherein said second edible oil comprises glycerin esterified with alpha-linolenic acid at all three positions of the triglyceride molecule.

36. An oxidation-resistant food composition that contains a mixture of at least two triglyceride-based edible oils that comprise about 4 to about 100 weight percent of said food composition, wherein at least one of said oils is a low linoleic acid content oil and the other of said oils is a triglyceride-based omega-3 enriching oil that is stabilized against oxidation in the absence of encapsulation and comprises omega-3 fatty acid that is alpha-linolenic acid esterified at all three glyceride positions in the triglyceride molecule, wherein the fatty acid portion of said mixture of said oils includes less than 10 percent by weight linoleic acid, at least 75 percent by weight of monounsaturated plus saturated fatty acids, and at least 3 percent by weight of said alpha-linolenic acid.

37. An oxidation-resistant food composition that contains a mixture of at least two triglyceride-based edible oils that comprise about 4 to about 100 weight percent of said food composition, wherein at least one of said oils is a low linoleic acid content oil and the other of said oils is a triglyceride-based omega-3 enriching oil that is stabilized against oxidation in the absence of encapsulation, wherein said enriching oil contains at least about 10 percent by weight omega-3 fatty acid that is alpha-linolenic acid and comprises glycerin esterified with alpha-linolenic acid at all three positions of the triglyceride molecule, and wherein the fatty acid portion of said mixture of said oils includes less than 10 percent by weight linoleic acid, at least 75 percent by weight of monounsaturated plus saturated fatty acids, and at least 3 percent by weight of said omega-3 fatty acids.

* * * * *